United States Patent
Yang et al.

(10) Patent No.: US 12,333,448 B2
(45) Date of Patent: Jun. 17, 2025

(54) MACHINE-LEARNED MODEL FOR DUPLICATE CRASH DUMP DETECTION

(71) Applicant: SAP SE, Walldorf (DE)

(72) Inventors: Hao Yang, Xi'an (CN); Yang Xu, Xi'an (CN); Yong Li, Xi'an (CN); Hyun Deok Choi, Seoul (KR)

(73) Assignee: SAP SE, Walldorf (DE)

( * ) Notice: Subject to any disclaimer, the term of this patent is extended or adjusted under 35 U.S.C. 154(b) by 1039 days.

(21) Appl. No.: 17/188,256

(22) Filed: Mar. 1, 2021

(65) Prior Publication Data
US 2022/0108191 A1  Apr. 7, 2022

Related U.S. Application Data

(60) Provisional application No. 63/086,403, filed on Oct. 1, 2020.

(51) Int. Cl.
*G06N 5/04* (2023.01)
*G06F 16/215* (2019.01)
*G06N 20/00* (2019.01)

(52) U.S. Cl.
CPC ............. *G06N 5/04* (2013.01); *G06F 16/215* (2019.01); *G06N 20/00* (2019.01)

(58) Field of Classification Search
CPC ......... G06N 5/04; G06N 20/00; G06F 16/215
USPC ......................................................... 706/12
See application file for complete search history.

(56) References Cited

U.S. PATENT DOCUMENTS

| | | | | |
|---|---|---|---|---|
| 2002/0198921 A1* | 12/2002 | Jameson | ............... | G06F 9/4843 718/101 |
| 2007/0283338 A1* | 12/2007 | Gupta | ..................... | G06F 11/36 717/154 |
| 2009/0106363 A1* | 4/2009 | Fallen | ................. | G06F 11/0781 709/204 |

(Continued)

FOREIGN PATENT DOCUMENTS

| | | | | |
|---|---|---|---|---|
| CN | 103235723 A | * | 8/2013 | |
| WO | WO-2015148328 A1 | * | 10/2015 | .......... G06F 11/0709 |

OTHER PUBLICATIONS

Askari, Mina, et al. Towards Understanding System Building. Apr. 5, 2005, pp. 1-13. (Year: 2005).*

(Continued)

*Primary Examiner* — Stephen S Hong
*Assistant Examiner* — Broderick C Anderson
(74) *Attorney, Agent, or Firm* — SCHWEGMAN LUNDBERG & WOESSNER, P.A.

(57) ABSTRACT

In an example embodiment, a machine learned model is utilized for identifying duplicate crash dumps. After a developer submits code, corresponding test cases are used to ensure the quality of the software delivery. Test failures can occur during this period, such as crashes, errors, and timeouts. Since it takes time for developers to resolve them, many duplicate failures can occur during this time period. In some embodiments, trash triggering is the most time-consuming task of development, and thus if duplicate crash failures can be automatically identified, the degree of automation will be significantly enhanced. To locate such duplicates, a training-based machine learned model uses component information of an in-memory database system to achieve better crash similarity comparison.

20 Claims, 11 Drawing Sheets

(56) References Cited

U.S. PATENT DOCUMENTS

2017/0185467 A1* 6/2017 Xiao .................. G06F 11/079

OTHER PUBLICATIONS

N. Modani, R. Gupta, G. Lohman, T. Syeda-Mahmood and L. Mignet, "Automatically Identifying Known Software Problems," 2007 IEEE 23rd International Conference on Data Engineering Workshop, Istanbul, Turkey, 2007, pp. 433-441, doi: 10.1109/ICDEW.2007.4401026. (Year: 2007).*

Cupurdija, Michel. Evaluating Methods for Grouping and Comparing Crash Dumps. Jan. 1, 2019. Accessed Apr. 25, 2024. (Year: 2019).*

Bettenburg, N, "What makes a good bug report?", Proceedings of the 16th ACM SIGSOFT International Symposium on Foundations of software engineering, (2008), 308-318.

Bettenburg, Nicolas, "Duplicate Bug Reports Considered Harmful . . . Really?", IEEE International Conference on Software Maintenance, (2008), 9 pgs.

Brodie, "Quickly Finding Known Software Problems via Automated Symptom Matching", The Computer Society, Proceedings of the Second International Conference on Autonomic Computing, (2005), 10 pgs.

Deshmukh, Jayati, "Towards Accurate Duplicate Bug Retrieval using Deep Learning Techniques", IEEE International Conference on Software Maintenance and Evolution, (2017), 115-124.

Ebert, C, "Devops", IEEE Software, vol. 33, No. 3, (2016), 94-100.

Farber, Franz, "SAP HANA Database—Data Management for Modern Business Applications", SIGMOD Record, vol. 40, No. 4, [Online]. Retrieved from the Internet: URL: http: www.sigmod.org publications sigmod-record 1112 pdfs 08.industry.farber.pdf, (Dec. 1, 2011), 45-51.

Galler, B A, "An improved equivalence algorithm", Commun. ACM, vol. 7, No. 5, (1964), 301-303.

Jalbert, N, "Automated duplicate detection for bug track-ing systems", Proc. International Conference on Dependable Systems and Networks With FTCS and DCC, (2008), 52-61.

Lattner, Chris, "LLVM and Clang: Next generation compiler technology", BSD Conference, (May 17, 2008), 33 pgs.

Lerch, J, "Finding duplicates of your yet unwritten bug report", IEEE. Proc. of European Conference on Software Maintenance and Reengineering, (2013), 69-78.

Levenshtein, V I, "Binary codes capable of correcting deletions insertions and reversals", Soviet Physics—Doklady, (1966), 4 pgs.

Louden, K, "", Compiler Construction: Principles and Practice, PWS Publishing, (1997), 591.

Runeson, Per, "Detection of Duplicate Defect Reports Using Natural Language Processing", Proceedings of the 29th international conference on Software Engineering, (2007), 10 pgs.

Sabor, K K, "DURFEX: a feature extraction technique for efficient detection of duplicate bug reports", IEEE international conference on software quality, reliability and security (QRS), (2017), 240-250.

Saha, K, "Improving bug localization using structured information retrieval", Proc. Int. Conf. Autom. Softw. Eng., (2013), 345-355.

Schroter, Adrian, "Do Stack Traces Help Developers Fix Bugs?", Proceedings of the 7th International Working Conference on Mining Software Repositories, (2010), 118-121.

Serrano, N, "Bugzilla, itracker and other bug trackers", IEEE Software, vol. 22, No. 2, (2005), 11-13.

Sikka, V., "Efficient Transaction Processing in SAP HANA Database—The End of a Column Store Myth", SIGMOD, (2012), 731-741.

Wang, S, "Version history, similar report, and structure: Putting them together for improved bug localization", 22nd International Conference on Program Comprehension, (2014), 53-63.

Ye, Xin, "Learning to Rank Relevant Files for Bug Reports using Domain Knowledge", FSE, (2014), 689-699.

* cited by examiner

MACHINE-LEARNED MODEL FOR
DUPLICATE CRASH DUMP DETECTION

TECHNICAL FIELD

This document generally relates to machine learning. More specifically, this document relates to a machine learned model for duplicate crash dump detection.

BACKGROUND

After a developer submits code, corresponding test cases are used to ensure the quality of the software delivery. Test failures can occur during this period, such as crashes, errors, and timeouts. Since it takes time for developers to resolve them, many duplicate failures can occur during this time period. Speed and efficiency are essential aspects of the software industry. In general, delivering a software product includes building, testing, releasing, and other processes. It is conceivable to automate software delivery, to make these practices transparent to the developer who has submitted code. Moreover, as more and more software is delivered with short development times, it essentially keeps the software in a constant release state, allowing the fast release of features and rapid responses to any failure.

During the testing process, plenty of delays arise, such as crashes, errors, and timeouts. This is especially true for a large-scale software system that contains several test suites for complex scenarios, such as those for in-memory database management systems. SAP HANA® from SAP SE of Walldorf, Germany, is a database product that supports complex business analytical processes in combination with transactionally consistent operational workloads.

In such systems, crash triaging is considered as the most time-consuming task. This means that developers cannot quickly get the feedback they need for the quality of their checks. Usually, when a crash failure occurs, a dump file containing stack frames will generate. This stack frame information is one of the most valuable items for developers. Stack traces provide developers insights about the place where a crash failure has occurred. However, stack traces can be rather verbose and require advanced domain knowledge and considerable time to investigate them.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
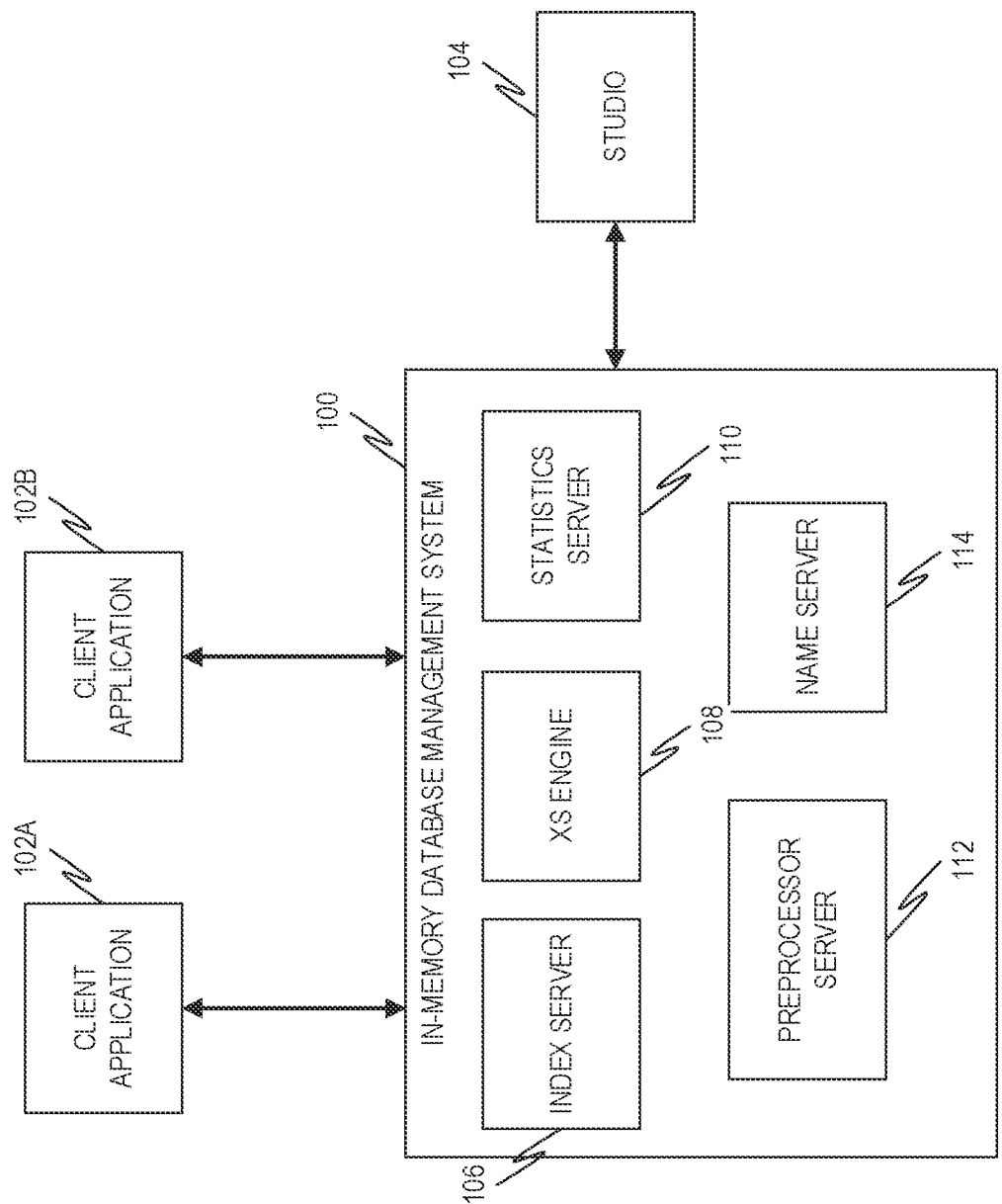
FIG. 1 is a diagram illustrating an in-memory database management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a machine learned model is utilized for identifying duplicate crash dumps. After a developer submits code, corresponding test cases are used to ensure the quality of the software delivery. Test failures can occur during this period, such as crashes, errors, and timeouts. Since it takes time for developers to resolve them, many duplicate failures can occur during this time period. In some embodiments, trash triggering is the most time-consuming task of development, and thus if duplicate crash failures can be automatically identified, the degree of automation will be significantly enhanced. To locate such duplicates, a training-based machine learned model uses component information of an in-memory database system to achieve better crash similarity comparison.

More particularly, a crash stack is examined and data is extracted from the crash stack and preprocessed, such as by removing offset values, parameter variables and return types. Certain frequently occurring functions may be excepted from this preprocessing.

The preprocessed data is then augmented by domain-specific knowledge. Specifically, regular expression and Breadth-First Search is used to extract Component-File mappings, and this is paired with File-Function mapping to complete a mapping of each function name to a particular component. This component information is fed with the preprocessed data into the machine learned model to produce a prediction of similarity (expressed as a similarity score) between two crash dumps.

The machine learned model may be trained by feeding labeled training data into a machine learning algorithm. Additionally, two parameters of a similarity score function, specifically the number of components that should be considered from the top of the call stack and the level of component distance, are additionally tuned and fed to the machine learned model. The result is a machine learned model that is able to predict the degree of similarity between two crash dumps.

Certain database management systems utilize a columnar engine. For example, SAP HANA™, which is an in-memory database, utilizes such an approach. A columnar engine stores each column of data separately, acting as its own separate index. This increases speed and efficiency of queries as entire columns not included in the query can be excluded. An in-memory database is a database that is stored in system memory, such as Random Access Memory (RAM), rather than in traditional persistent storage, such as a hard drive. Using the columnar engine is a promising approach to deal with transactional and analytical workloads simultaneously. Furthermore, retrieval is the primary operation of OLTP (On-Line Transactional Processing) and OLAP (OnLine Analytical Processing), which will benefit from column-wise compression.

FIG. 1 is a diagram illustrating an in-memory database management system 100, in accordance with an example embodiment. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

Also depicted is a studio 104, used to perform modeling or basic database access and operations management by accessing the in-memory database management system 100.

The in-memory database management system 100 may comprise a number of different components, including an index server 106, an XS engine 108, a statistics server 110, a preprocessor server 112, and a name server 114. These components may operate on a single computing device, or may be spread among multiple computing devices (e.g., separate servers).

The index server 106 contains the actual data and the engines for processing the data. It also coordinates and uses all the other servers.

The XS engine 108 allows clients to connect to the in-memory database management system 100 using web protocols, such as HTTP.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which text search capabilities are based.

The name server 114 holds information about the database topology. This is used in a distributed system with instances of the database on different hosts. The name server 114 knows where the components are running and which data is located on which server.

Figure 2:
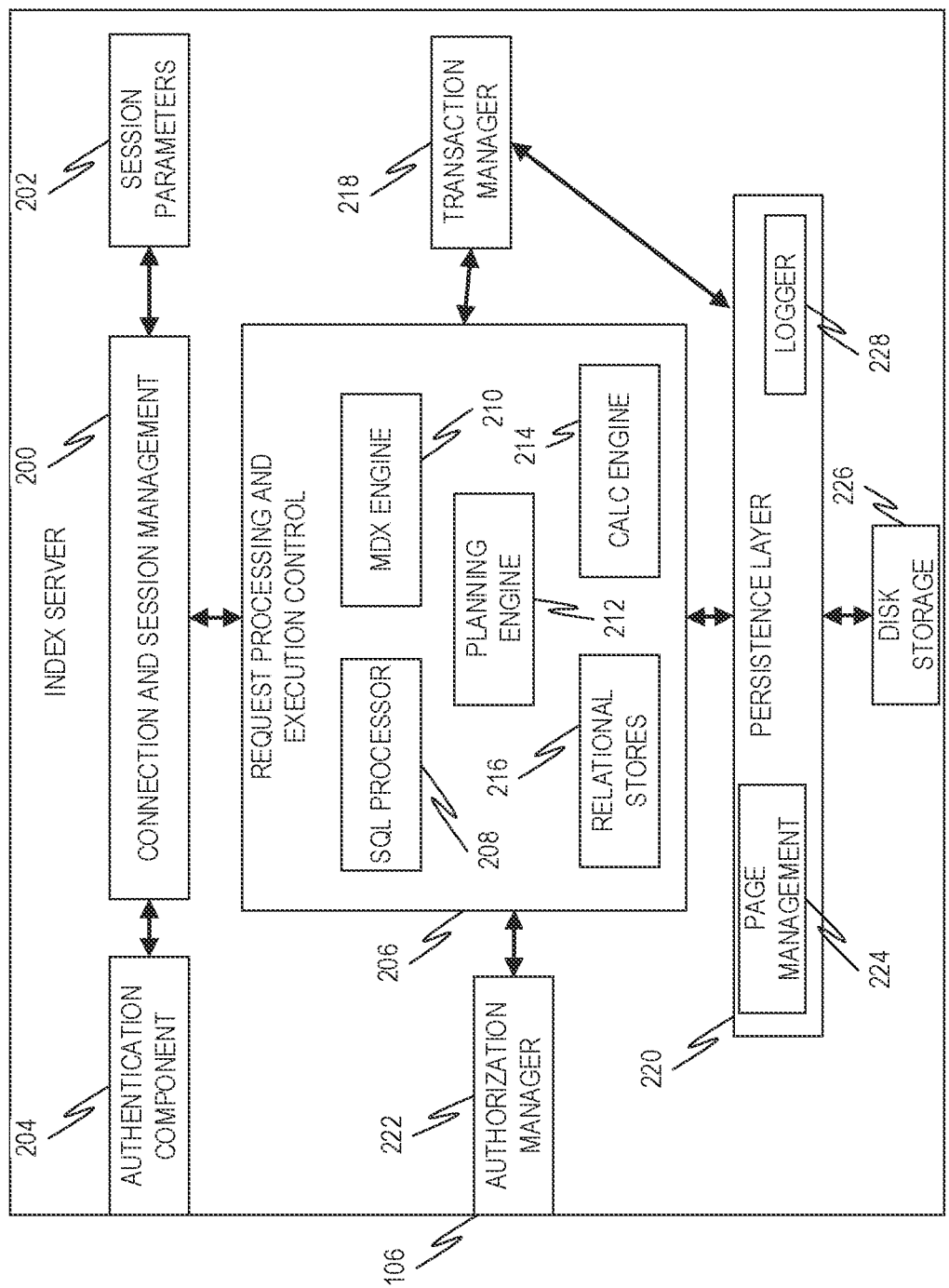
FIG. 2 is a diagram illustrating an index server, in accordance with an example embodiment.

FIG. 2 is a diagram illustrating an index server 106, in accordance with an example embodiment. Specifically, the index server 106 of FIG. 1 is depicted in more detail. The index server 106 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, etc. Users (e.g., system administrators, developers) may be authenticated by the database system itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
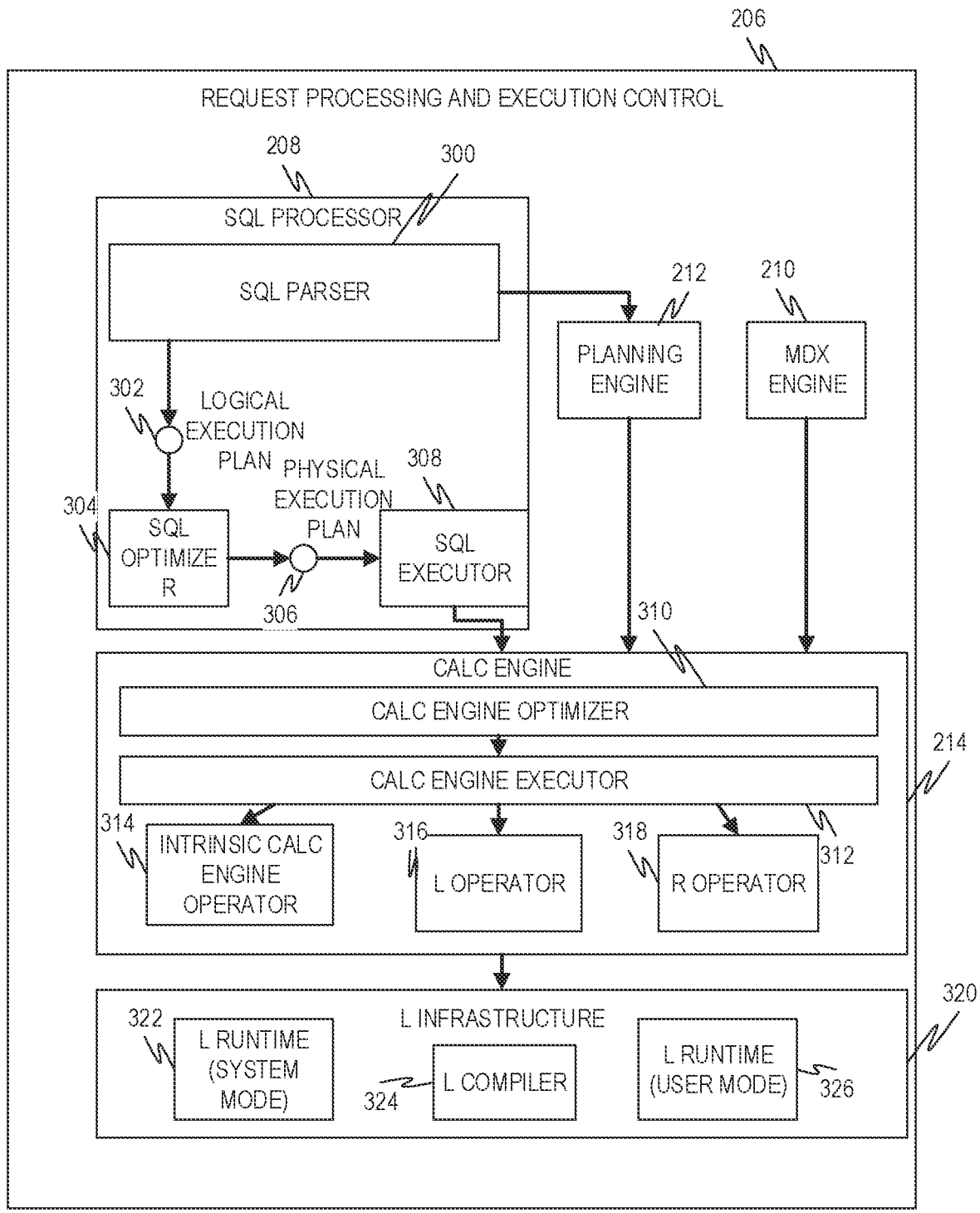
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations, and a calc engine executor 312, which executes the operations, as well as an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

In an example embodiment, instances can be template-based. This helps to reduce the need to copy the same code over and over again for different instances. Instances do not have a class they conform to, but templates can be used for a similar feature, which is used as a copy template during instance creation.

Figure 4:
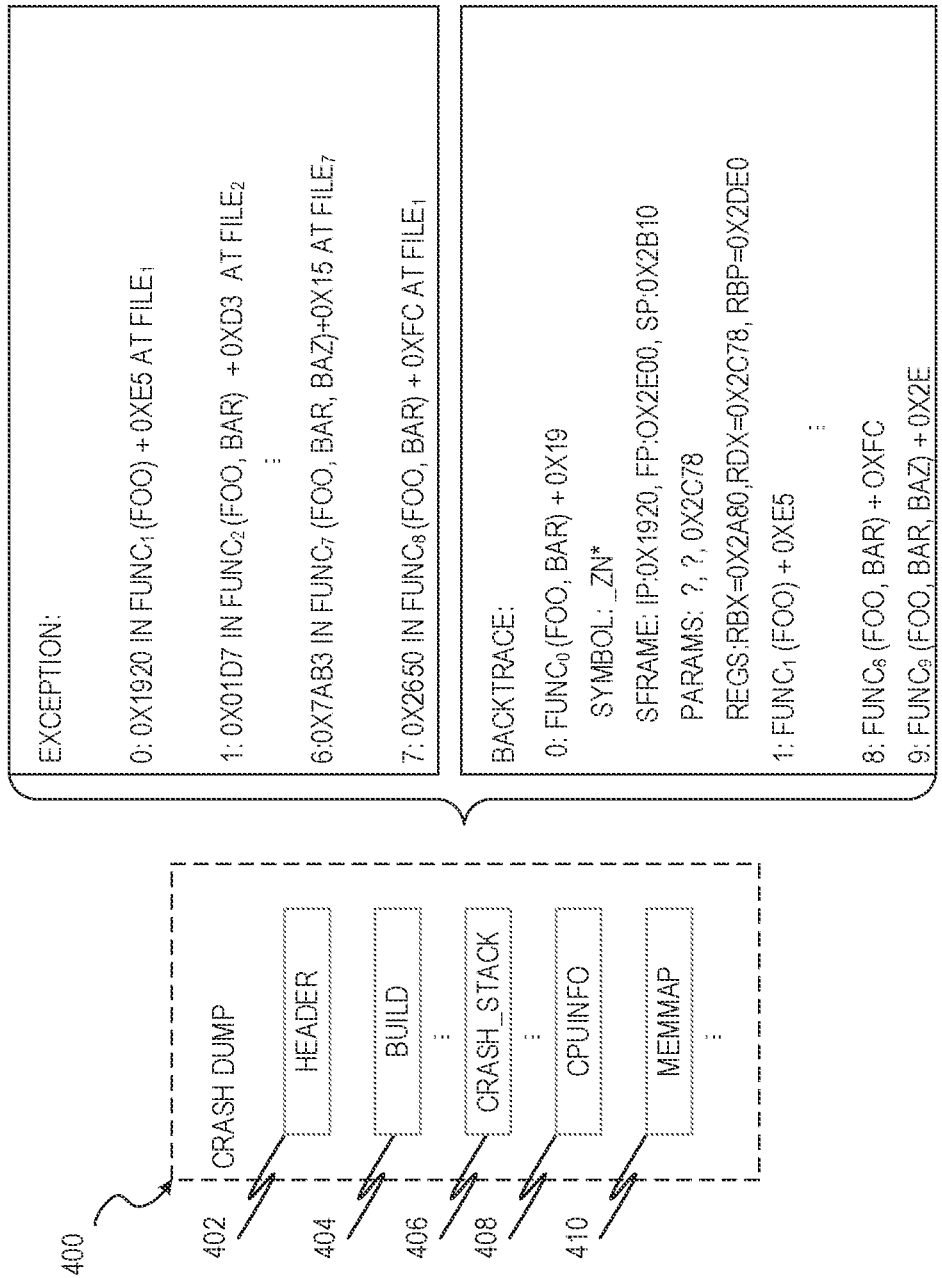
FIG. 4 is an example of a crash dump file, in accordance with an example embodiment.

As can be seen from the above, a database contains a series of components, any one of which could cause a crash and thus be the cause of a crash failure written to a crash stack. Specifically, during the testing process, a dump file is generated (also known as a crash dump) that contains information about the software's state when the crash occurred, to be used by developers to fix the bug. This information may include stack traces and register contents. FIG. 4 is an example of a crash dump file 400, in accordance with an example embodiment. At the top is a header 402 that contains general information such as the Process ID (PID). Then there are several sections such as build 404, crash stack 406, CPU Info 408 and MEM map 410. Since the content of the call stack exists in crash stack 406, this section becomes the focus. Sometimes the call stack may contain an exception and sometimes it is backtrace-only. The exception is the more crucial part of the call stack, and more likely to be the root cause of a crash failure.

Figure 5:
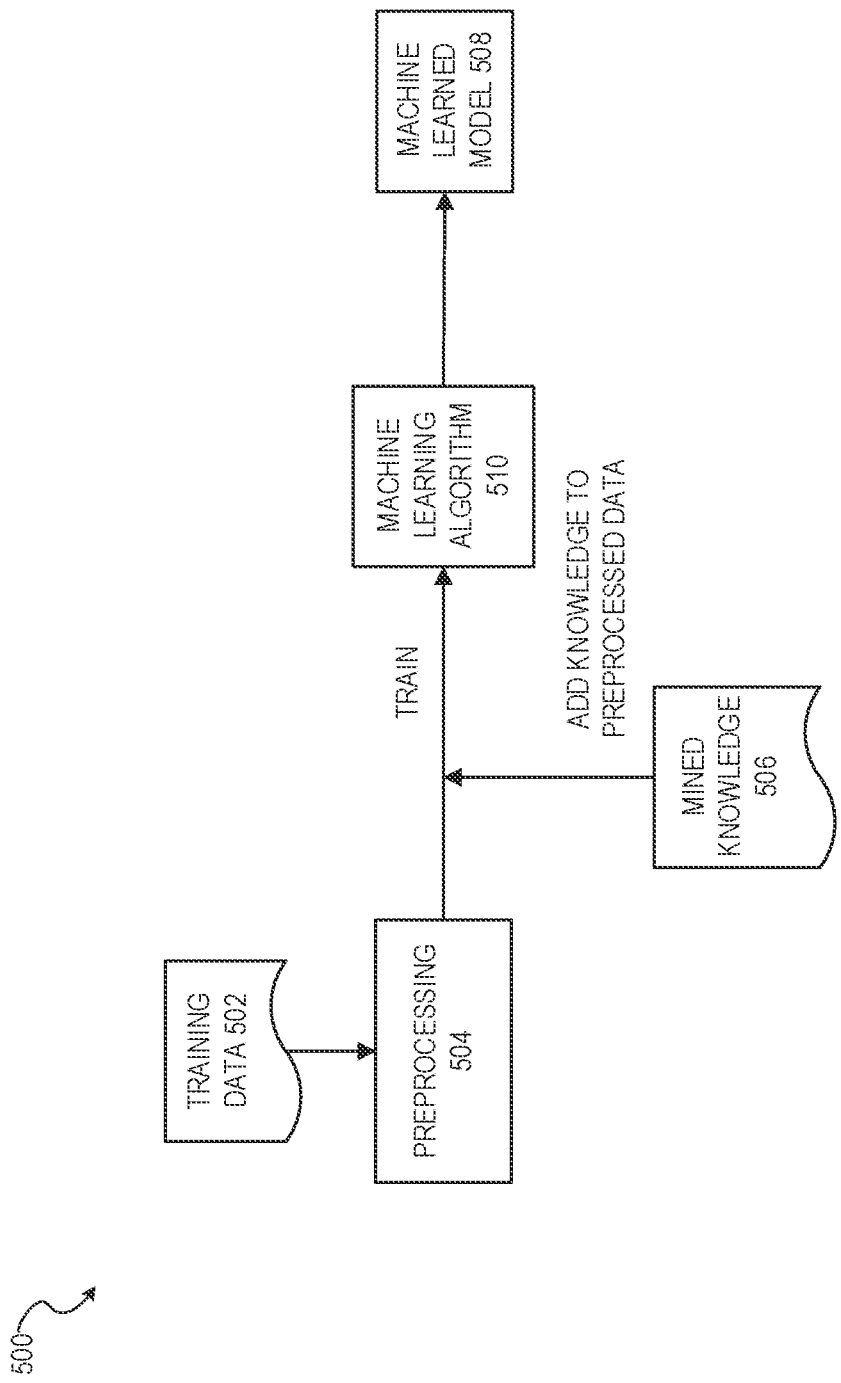
FIG. 5 is a diagram illustrating an overall workflow of an approach for automatically detecting duplicate crash dumps, in accordance with an example embodiment.

FIG. 5 is a diagram illustrating an overall workflow 500 of an approach for automatically detecting duplicate crash dumps, in accordance with an example embodiment. Specifically, this workflow 500 depicts how a machine learned model is trained to detect the crash dumps. Training data 502 may include the source code and historical crash data. For each crash dump in the historical crash data, preprocessing 504 may be performed to remove some irrelevant information. Next, mined knowledge 506 is added to convert the function-based call stack into a component sequence (specifically taking the call stack, which referred to individual functions executing when the crash occurred, and transforming it to include identifications of components from which the crash occurred). This transformed and preprocessed training data is then used to train a machine learned model 508 using a machine learning algorithm 510. At runtime, new crash data can similarity be preprocessed and transformed to include knowledge about components, and then fed to the machine learned model 508, which outputs a prediction of which crash dumps are duplicate.

The preprocessing aspect removes irrelevant information, such as offset addresses. Additionally, only the function name itself is needed, which allows parameter variables and return types to be removed as well. Moreover, some of the detailed information can also be removed, including "SFrame", "Params", "Regs." By comparing exception and backtrace, frequently occurring dispensable function names can be identified. These may be designated as stop words. For the backtrace shown in FIG. 4, the serial numbers of stop words are 0 and 9. Before calculating similarity, filtering stop words can effectively improve the precision.

In an example embodiment, the number of stop words is predetermined. In another example embodiment, the number of stop words is dynamically determined based on runtime conditions. In yet another example embodiment, the number of stop words is determined using a machine learned model.

With respect to adding knowledge about components to the data, HANA™ is developed using C++, using CMake to describe its building process. CMake is a meta build system that uses scripts called CMakeLists to generate build files for a specific environment. An example of CMakeLists in HANA™ is shown as follows.

```
1 #All files in this directory and its sub
2 #directories belong to ComponentA
3 SET_COMPONENT ("ComponentA")
4 #Except for File1 and File2 which belong to
5 #ComponentB
6 SET_COMPONENT ("ComponentB"
7 File1
8 File2
9)
```

Directories or individual files can be associated with a specific component via the SET COMPONENT function. The function takes either just a component name or a component name with a list of files. The former associates all files in the current directory with the specified component, and the latter associates the specified files with the component. Regular expression and BFS (Breadth-First Search) may be used to extract Component-File mapping that exits in the layered CMakeLists.

In computer science, lexical analysis involves converting a sequence of characters into a token stream. Then, syntactic analysis can take the output from lexical analysis and build a data structure called an AST (Abstract Syntax Tree). The AST may be used to extract all fully qualified function names in the C++ file. Finally, a File-Function mapping can be obtained. With the relationship of Component-File learned earlier, the conversion from function to component in the data (training or non-training) can be completed.

Figure 6:
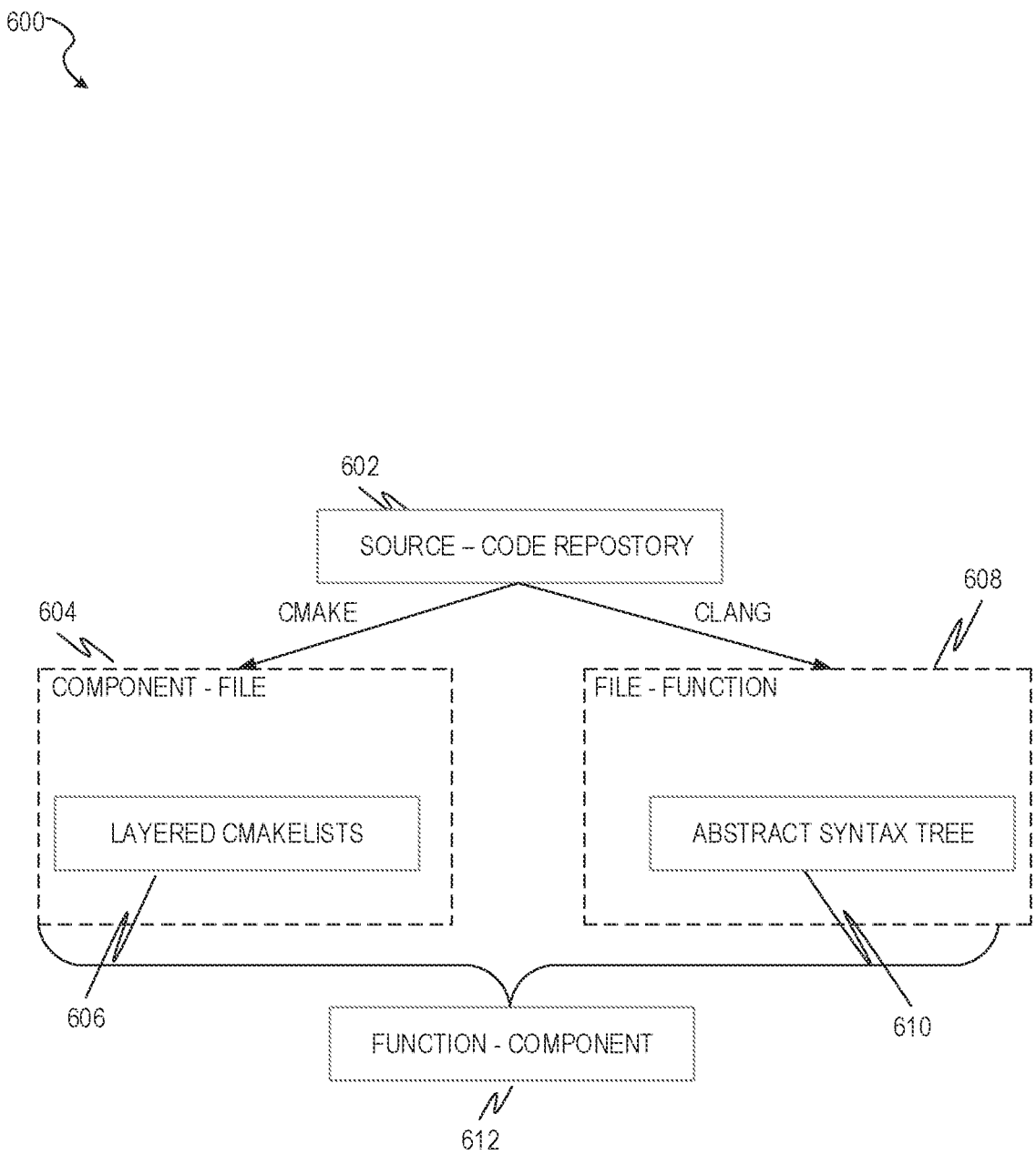
FIG. 6 is a diagram illustrating a method of obtaining a function-component mapping in accordance with an example embodiment.

FIG. 6 is a diagram illustrating a method 600 of obtaining a function-component mapping in accordance with an example embodiment. Here, a CMake command is utilized to obtain, from a source-code repository 602, a component-file mapping 604, in the form of layered CMakeLists 606. A Clang command is then utilized to obtain, from the source-code repository 602, a file-function mapping 608, in the form of an abstract syntax tree 610. The component-file mapping 604 and the file-function mapping 608 are then combined to produce the function-component mapping 612.

Figure 7:
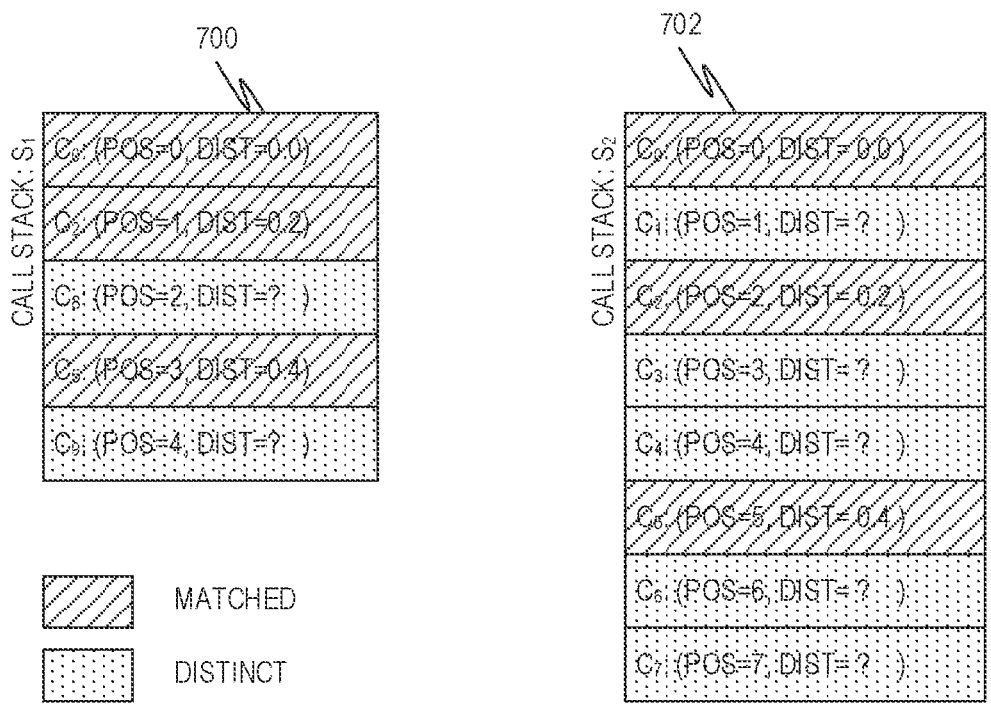
FIG. 7 is a diagram illustrating an example of component sequences of data (training or non-training) in accordance with an example embodiment.

FIG. 7 is a diagram illustrating an example of component sequences 700, 702 of data (training or non-training) in accordance with an example embodiment. This is still a call stack but replaced with component information. The components in S1 700 and S2 702 are listed in order from top to bottom. As can be seen, some components in S1 700 match the components in S2 702 (CO, C2 and C5). This means that they have the same component name. The similarity between two call stacks, such as S1 700 and S2 702, is defined as follows.

$$\text{Similarity} = \frac{\sum_{cpnt \in LCS} e^{-m \times pos} e^{-n \times dist}}{\sum_{i=0}^{max} e^{-m \times i}}$$

In detail, $\sum_{cpnt \in LCS}$ means that the Longest Common Subsequence (LCS) from each call stack pair is obtained and only this part is summed. Pos represents the component position (from zero). Each calculation takes the maximum position of matched components, and m is a coefficient to adjust the rate of change caused by position. Dist stands for the component distance. It is a normalized edit distance based on the function names in a component. Furthermore, n is a coefficient to adjust the rate of change caused by distance. Max represents the maximum possible component position in each call stack pair.

The component position in a call stack and the component distance with multiple function names may be chosen as two different features. A farther component from the top of a call stack should have a lower weight, and its influence will decrease by the increase of component position. Hence, $e^{-m \times pos}$ is used to describe a component position feature. Likewise, a component that contains more similar function names should have a higher weight, and the influence should decrease as component distance increases. Hence, $e^{-n \times dist}$ is used to describe a component distance feature. Furthermore, to make the similarity result between 0 and 1, the numerator must be less than the denominator. Hence $$\sum_{i=\infty}^{max} e^{-m \times i}$$

is used as the denominator, with m being the same as in the numerator. In an example embodiment, the result of this calculation, which is a score, is the output of the machine learned model for a given pair of crash dumps. The score is indicative of the probability that the crash dumps in the pair are duplicates. In some example embodiments, this score may then be compared to a threshold to perform or not perform some action, essentially classifying the pair as duplicates or not and performing or not performing some action based on this classification. The action may include, in the case where the pair are duplicates, deleting one of the crash dumps in the pair or at least filtering it out so it is not used for further analysis.

The machine-learned model uses two coefficients: m is a coefficient related to the number of components that should be considered from the top of a call stack; n is a coefficient associated with the level of component distance, which should be involved in similarity calculation. These parameter values can set randomly, but it will affect the result if they are not suitable. Hence, the training of the machine learned model may include using a machine learning algorithm to tune both m and n. The algorithm may include performing the following:

```
Algorithm: Parameter Tuning
Input: training set D;
Output: optimal value pair (mopt, nopt);
1   AUCmax ←0;
2   (mopt, nopt) ←0, 0);
3   for m = 0.0; m ≤2.0; m += 0.1 do
4      for n = 0.0; n ≤2.0; n += 0.1 do
5         Compute AUC based on D;
6         if AUC > AUCmax then
7            AUCmax ←AUC;
8            (mopt, nopt) ←(m, n);
9   return (mopt, nopt),
```

Here, the interval of m and n are empirically chosen as [0.0, 1.0], and m and n are increased by 0.1 at each iteration. Next, the AUC (Area Under ROC Curve) calculation performs on all call stack pairs in the training set, and the value of (mopt, nopt) is recorded when obtaining the optimal AUC. Finally, these tuned parameters return. The input of the tuning algorithm is a training set prepared in advance. It is based on the historical crash data of SAP HANA.

In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

It should also be noted that the machine learning algorithm may, in some example embodiments, be used to learn more than just the values of m and n but may also be used to learn additional features and/or parameters for the similarity calculation itself. For example, the machine learning algorithm may learn that a more accurate calculation may be obtained if a variable is added that examines whether certain particular function calls are in the crash dumps, due to the fact that in training data these particular function calls were only ever contained in duplicate crash dumps.

Figure 8:
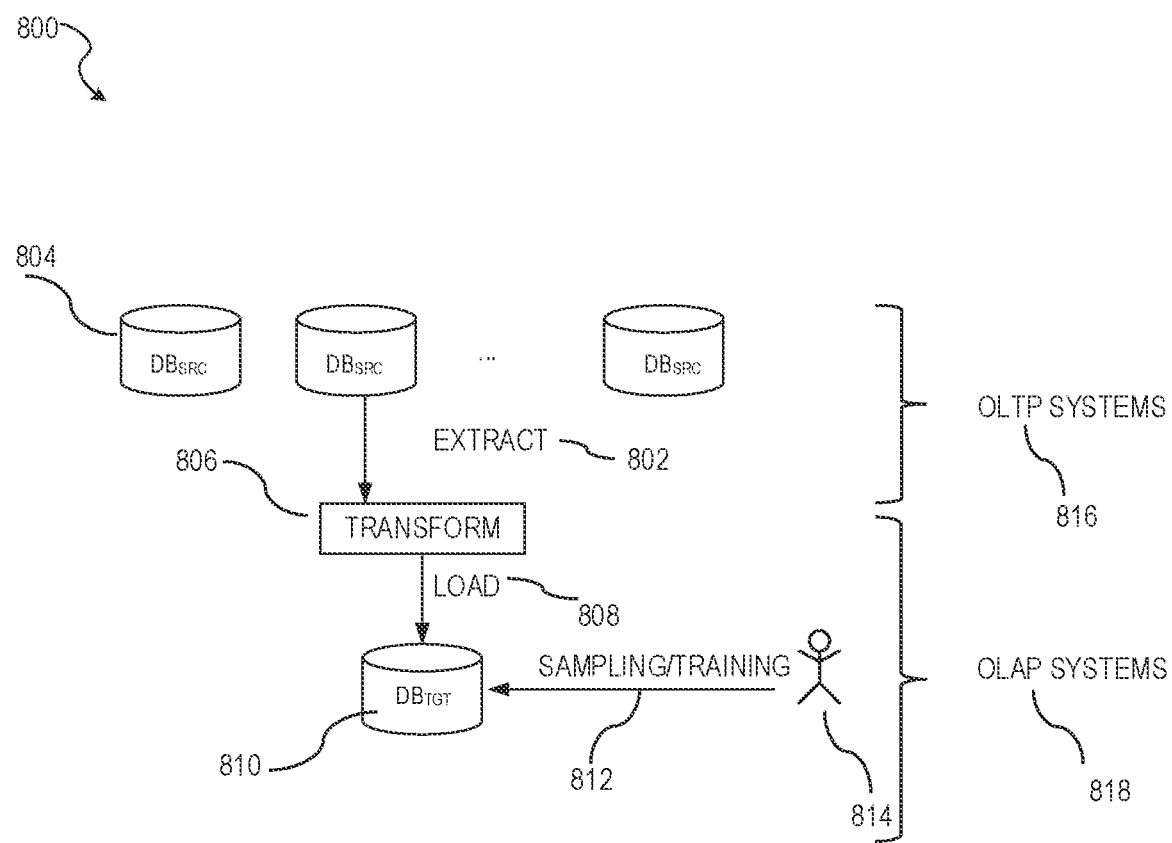
FIG. 8 is a block diagram illustrating a training service architecture, in accordance with an example embodiment.

FIG. 8 is a block diagram illustrating a training service architecture 800, in accordance with an example embodiment. A data extraction operation 802 is performed on a source database system 804. Then a data transformation operation 806 is performed on the extracted data. The transformed data is then loaded 808 into a target database system 810, on which the sampling and training 812 can be performed by a user 814. It should be noted that the data extraction operation 802 may be performed via an Online Transactional Processing (OLTP) system 816 while the data transformation operation 806, loading 808, and sampling and training 812 may be performed by an Online Analytical Processing (OLAP) system 818.

Figure 9:
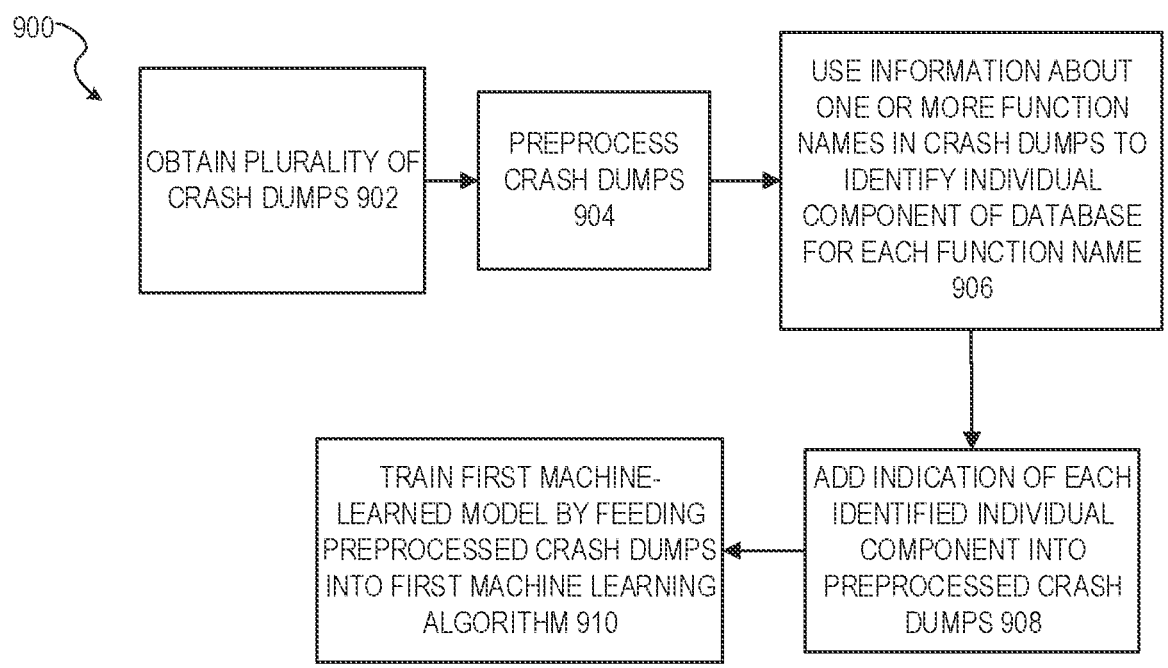
FIG. 9 is a flow diagram illustrating a method for training a machine learned model, in accordance with an example embodiment.

FIG. 9 is a flow diagram illustrating a method 900 for training a machine learned model, in accordance with an example embodiment. At operation 902, a plurality of crash dumps in a computer system is obtained. The crash dumps each comprise a separate file containing information about a crash failure that occurred during operation of a database, the information including one or more function names and one or more parameters. At operation 904, the plurality of crash dumps is preprocessed by removing the one or more parameters from each crash dump in the plurality of crash dumps. Other non-essential material can also be removed, including a first number of most frequently occurring function names, the first number determined dynamically, possibly by its own machine learned model. At operation 906, the one or more function names in each of the preprocessed crash dumps is used to identify an individual component of the database for each of the one or more function names. This may include using breadth-first search to extract component-file mappings in layered CMakeLists from the database, and combining the component-file mappings with file-function mappings obtained from an abstract syntax tree of the database.

At operation 908, an indication of each of the identified individual components is added into the preprocessed plurality of crash dumps. At operation 910, a first machine-learned model is trained by feeding the preprocessed plurality of crash dumps into a first machine learning algorithm, the first machine-learned model trained to output a similarity score between two crash dumps using a longest common subsequence from each crash dump, a coefficient indicating a number of components to consider from a top of a crash dump, and a coefficient indicating a level of component distance.

Figure 10:
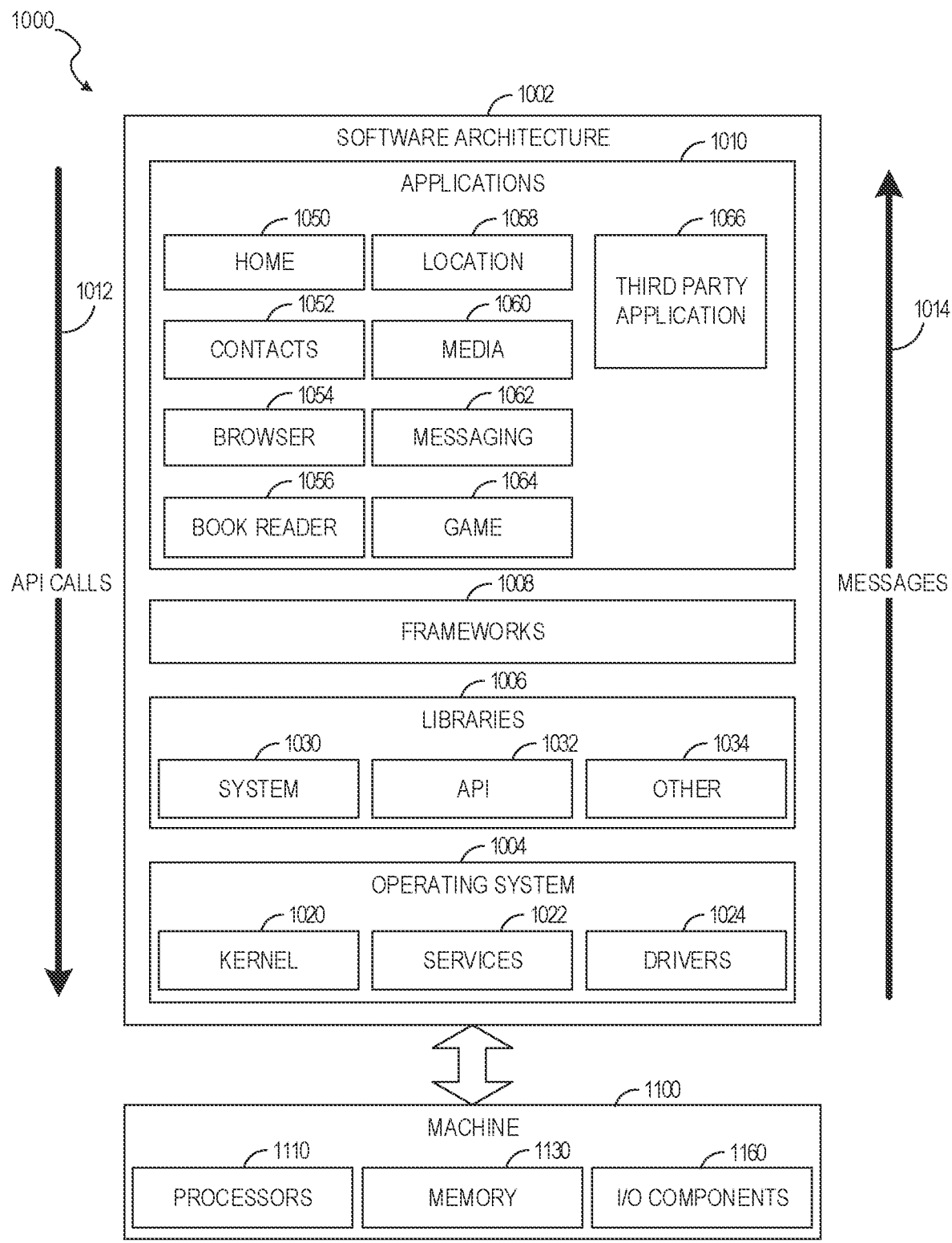
FIG. 10 is a block diagram illustrating an architecture of software, which can be installed on any one or more of the devices described herein.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
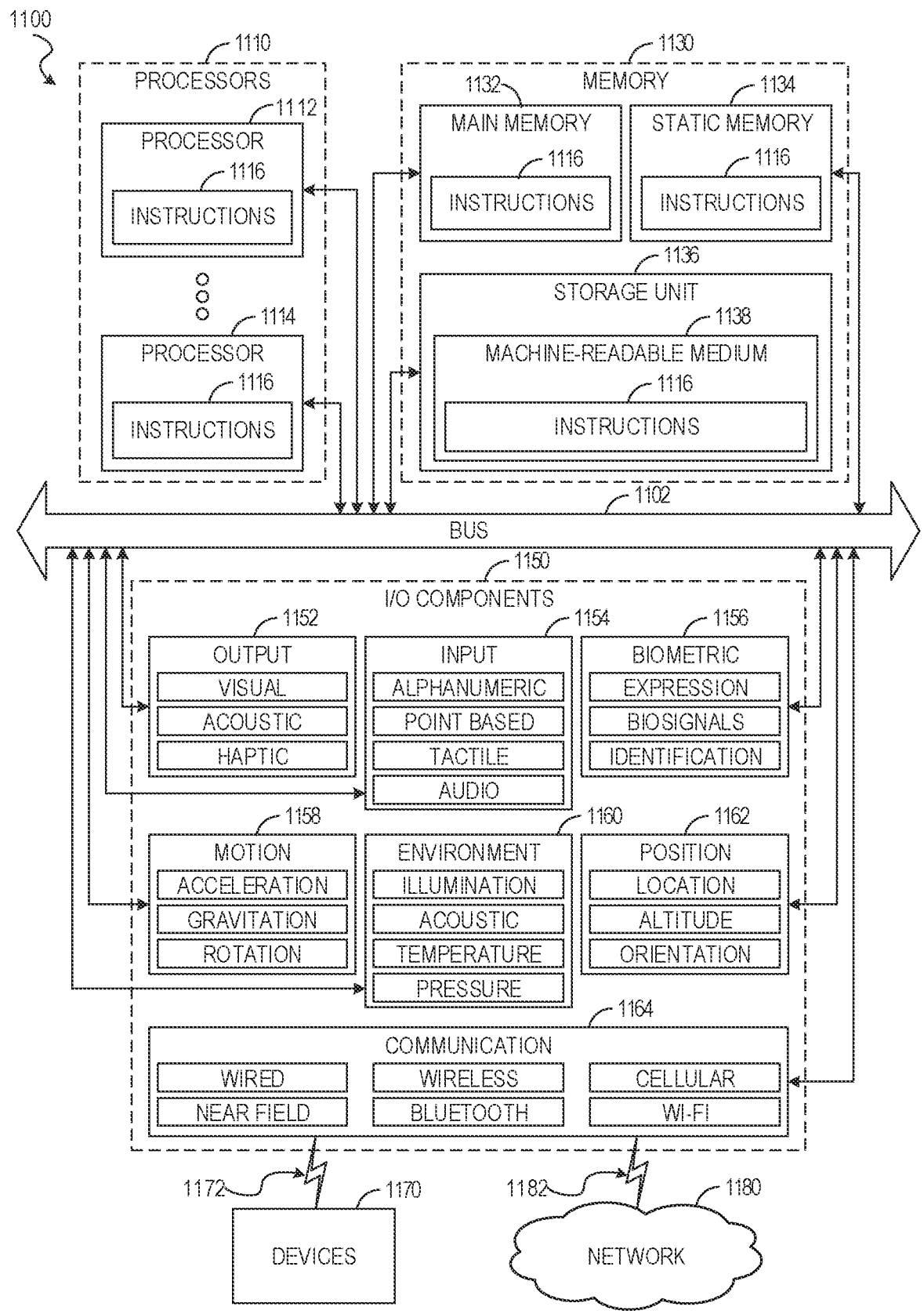
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods of FIG. 3. Additionally, or alternatively, the instructions 1116 may implement FIGS. 1-8 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Examples

Example 1. A system comprising:
at least one hardware processor; and
a non-transitory computer-readable medium storing instructions that, when executed by the at least one hardware processor, cause the at least one hardware processor to perform operations comprising:
obtaining a plurality of crash dumps in a computer system, the crash dumps each comprising a separate file containing information about a crash failure that occurred during operation of a database, the information including one or more function names and one or more parameters;
preprocessing the plurality of crash dumps by removing the one or more parameters from each crash dump in the plurality of crash dumps;
using the one or more function names in each of the crash dumps to identify an individual component of the database for each of the one or more function names;
adding an indication of each of the identified individual components into the preprocessed plurality of crash dumps; and
training a first machine-learned model by feeding the preprocessed plurality of crash dumps into a first machine learning algorithm, the first machine-learned model trained to output a similarity score between two crash dumps using a longest common subsequence from each crash dump, a coefficient indicating a number of components to consider from a top of a crash dump, and a coefficient indicating a level of component distance.

Example 2. The system of Example 1, wherein the coefficient indicating the number of components to consider from the top of a crash dump and the coefficient indicating the level of component distance are learned using a second machine learning algorithm.

Example 3. The system of Examples 1 or 2, wherein the database is an in-memory database.

Example 4. The system of any of Examples 1-3, wherein the operations further comprise feeding a first and a second crash dump into the first machine-learned model and eliminating either the first or the second crash dump if a similarity score for the first and second crash dumps exceeds a predetermined threshold.

Example 5. The system of any of Examples 1-4, wherein the preprocessing further comprises: filtering out a first number of most frequently occurring function names, the first number determined dynamically.

Example 6. The system of any of Examples 1-5, wherein the using the one or more function names in each of the crash dumps to identify an individual component of the database for each of the one or more function names includes using a breadth-first search to extract component-file mappings in layered CMakeLists from the database.

Example 7. The system of Example 6, wherein the using the one or more function names in each of the crash dumps to identify an individual component of the database for each of the one or more function names further comprises combining the component-file mappings with file-function mappings obtained from an abstract syntax tree of the database.

Example 8. A method comprising:
obtaining a plurality of crash dumps in a computer system, the crash dumps each comprising a separate file containing information about a crash failure that occurred during operation of a database, the information including one or more function names and one or more parameters;
preprocessing the plurality of crash dumps by removing the one or more parameters from each crash dump in the plurality of crash dumps;
using the one or more function names in each of the crash dumps to identify an individual component of the database for each of the one or more function names;
adding an indication of each of the identified individual components into the preprocessed plurality of crash dumps; and
training a first machine-learned model by feeding the preprocessed plurality of crash dumps into a first machine learning algorithm, the first machine-learned model trained to output a similarity score between two crash dumps using a longest common subsequence from each crash dump, a coefficient indicating a number of components to consider from a top of a crash dump, and a coefficient indicating a level of component distance.

Example 9. The method of Example 8, wherein the coefficient indicating the number of components to consider from the top of a crash dump and the coefficient indicating the level of component distance are learned using a second machine learning algorithm.

Example 10. The method of Examples 8 or 9, wherein the database is an in-memory database.

Example 11. The method of any of Examples 8-10, further comprising feeding a first and a second crash dump into the first machine-learned model and eliminating either the first or the second crash dump if a similarity score for the first and second crash dumps exceeds a predetermined threshold.

Example 12. The method of any of Examples 8-11, wherein the preprocessing further comprises: filtering out a first number of most frequently occurring function names, the first number determined dynamically.

Example 13. The method of any of Examples 8-12, wherein the using the one or more function names in each of the crash dumps to identify an individual component of the database for each of the one or more function names includes using a breadth-first search to extract component-file mappings in layered CMakeLists from the database.

Example 14. The method of Example 13, wherein the using the one or more function names in each of the crash dumps to identify an individual component of the database for each of the one or more function names further comprises combining the component-file mappings with file-function mappings obtained from an abstract syntax tree of the database.

Example 15. A non-transitory machine-readable medium storing instructions which, when executed by one or more processors, cause the one or more processors to perform operations comprising:
obtaining a plurality of crash dumps in a computer system, the crash dumps each comprising a separate file containing information about a crash failure that occurred during operation of a database, the information including one or more function names and one or more parameters;
preprocessing the plurality of crash dumps by removing the one or more parameters from each crash dump in the plurality of crash dumps;
using the one or more function names in each of the crash dumps to identify an individual component of the database for each of the one or more function names;
adding an indication of each of the identified individual components into the preprocessed plurality of crash dumps; and
training a first machine-learned model by feeding the preprocessed plurality of crash dumps into a first machine learning algorithm, the first machine-learned model trained to output a similarity score between two crash dumps using a longest common subsequence from each crash dump, a coefficient indicating a number of components to consider from a top of a crash dump, and a coefficient indicating a level of component distance.

Example 16. The non-transitory machine-readable medium of Example 15, wherein the coefficient indicating the number of components to consider from the top of a crash dump and the coefficient indicating the level of component distance are learned using a second machine learning algorithm.

Example 17. The non-transitory machine-readable medium of Examples 15 or 16, wherein the database is an in-memory database.

Example 18. The non-transitory machine-readable medium of any of Examples 15-17, wherein the operations further comprise feeding a first and a second crash dump into the first machine-learned model and eliminating either the first or the second crash dump if a similarity score for the first and second crash dumps exceeds a predetermined threshold.

Example 19. The non-transitory machine-readable medium of any of Examples 15-18, wherein the preprocessing further comprises: filtering out a first number of most frequently occurring function names, the first number determined dynamically.

Example 20. The non-transitory machine-readable medium of any of Examples 15-19, wherein the using the one or more function names in each of the crash dumps to identify an individual component of the database for each of the one or more function names includes using a breadth-first search to extract component-file mappings in layered CMakeLists from the database.

What is claimed is:
1. A system comprising:
at least one hardware processor; and
a non-transitory computer-readable medium storing instructions that, when executed by the at least one hardware processor, cause the at least one hardware processor to perform operations comprising:
obtaining a plurality of crash dumps in a computer system, the crash dumps each comprising a separate file containing information about a crash failure that occurred during operation of a database, the information including one or more function names and one or more parameters;

preprocessing the plurality of crash dumps by removing the one or more parameters from each crash dump in the plurality of crash dumps;

using the one or more function names in each of the crash dumps to identify an individual component of the database for each of the one or more function names;

adding an indication of each of the identified individual components into the preprocessed plurality of crash dumps; and training a first machine-learned model by feeding the preprocessed plurality of crash dumps and a coefficient indicating a level of component distance into a first machine learning algorithm, the first machine-learned model trained to output a similarity score between two crash dumps using a longest common subsequence from each crash dump, the first machine-learning model basing the similarity score on a coefficient indicating a number of components to consider from a top of a crash dump, component position in the crash dump, and the coefficient indicating the level of component distance, the level of component distance being a measurement of how similar two components are based on similarity of function names of the two components, each component being a software module upon which one or more functions are executed.

2. The system of claim 1, wherein the coefficient indicating the number of components to consider from the top of a crash dump and the coefficient indicating the level of component distance are learned using a second machine learning algorithm.

3. The system of claim 1, wherein the database is an in-memory database.

4. The system of claim 1, wherein the operations further comprise feeding a first and a second crash dump into the first machine-learned model and eliminating either the first or the second crash dump if a similarity score for the first and second crash dumps exceeds a predetermined threshold.

5. The system of claim 1, wherein the preprocessing further comprises: filtering out a first number of most frequently occurring function names, the first number determined dynamically.

6. The system of claim 1, wherein the using the one or more function names in each of the crash dumps to identify an individual component of the database for each of the one or more function names includes using a breadth-first search to extract component-file mappings in layered CMakeLists from the database.

7. The system of claim 6, wherein the using the one or more function names in each of the crash dumps to identify an individual component of the database for each of the one or more function names further comprises combining the component-file mappings with file-function mappings obtained from an abstract syntax tree of the database.

8. A method comprising:

obtaining a plurality of crash dumps in a computer system, the crash dumps each comprising a separate file containing information about a crash failure that occurred during operation of a database, the information including one or more function names and one or more parameters;

preprocessing the plurality of crash dumps by removing the one or more parameters from each crash dump in the plurality of crash dumps;

using the one or more function names in each of the crash dumps to identify an individual component of the database for each of the one or more function names;

adding an indication of each of the identified individual components into the preprocessed plurality of crash dumps; and training a first machine-learned model by feeding the preprocessed plurality of crash dumps and a coefficient indicating a level of component distance into a first machine learning algorithm, the first machine-learned model trained to output a similarity score between two crash dumps using a longest common subsequence from each crash dump, the first machine-learning model basing the similarity score on a coefficient indicating a number of components to consider from a top of a crash dump, component position in the crash dump, and the coefficient indicating the level of component distance, the level of component distance being a measurement of how similar two components are based on similarity of function names of the two components, each component being a software module upon which one or more functions are executed.

9. The method of claim 8, wherein the coefficient indicating the number of components to consider from the top of a crash dump and the coefficient indicating the level of component distance are learned using a second machine learning algorithm.

10. The method of claim 8, wherein the database is an in-memory database.

11. The method of claim 8, further comprising feeding a first and a second crash dump into the first machine-learned model and eliminating either the first or the second crash dump if a similarity score for the first and second crash dumps exceeds a predetermined threshold.

12. The method of claim 8, wherein the preprocessing further comprises: filtering out a first number of most frequently occurring function names, the first number determined dynamically.

13. The method of claim 8, wherein the using the one or more function names in each of the crash dumps to identify an individual component of the database for each of the one or more function names includes using a breadth-first search to extract component-file mappings in layered CMakeLists from the database.

14. The method of claim 13, wherein the using the one or more function names in each of the crash dumps to identify an individual component of the database for each of the one or more function names further comprises combining the component-file mappings with file-function mappings obtained from an abstract syntax tree of the database.

15. A non-transitory machine-readable medium storing instructions which, when executed by one or more processors, cause the one or more processors to perform operations comprising:

obtaining a plurality of crash dumps in a computer system, the crash dumps each comprising a separate file containing information about a crash failure that occurred during operation of a database, the information including one or more function names and one or more parameters;

preprocessing the plurality of crash dumps by removing the one or more parameters from each crash dump in the plurality of crash dumps;

using the one or more function names in each of the crash dumps to identify an individual component of the database for each of the one or more function names;

adding an indication of each of the identified individual components into the preprocessed plurality of crash dumps; and training a first machine-learned model by feeding the preprocessed plurality of crash dumps and a coefficient indicating a level of component distance into a first machine learning algorithm, the first machine-learned model trained to output a similarity score between two crash dumps using a longest common subsequence from each crash dump, the first machine-learning model basing the similarity score on a coefficient indicating a number of components to consider from a top of a crash dump, component position in the crash dump, and the coefficient indicating the level of component distance, the level of component distance being a measurement of how similar two components are based on similarity of function names of the two components, each component being a software module upon which one or more functions are executed.

16. The non-transitory machine-readable medium of claim 15, wherein the coefficient indicating the number of components to consider from the top of a crash dump and the coefficient indicating the level of component distance are learned using a second machine learning algorithm.

17. The non-transitory machine-readable medium of claim 15, wherein the database is an in-memory database.

18. The non-transitory machine-readable medium of claim 15, wherein the operations further comprise feeding a first and a second crash dump into the first machine-learned model and eliminating either the first or the second crash dump if a similarity score for the first and second crash dumps exceeds a predetermined threshold.

19. The non-transitory machine-readable medium of claim 15, wherein the preprocessing further comprises: filtering out a first number of most frequently occurring function names, the first number determined dynamically.

20. The non-transitory machine-readable medium of claim 15, wherein the using the one or more function names in each of the crash dumps to identify an individual component of the database for each of the one or more function names includes using a breadth-first search to extract component-file mappings in layered CMakeLists from the database.

* * * * *